(12) United States Patent
Armiroli et al.

(10) Patent No.: US 6,424,072 B1
(45) Date of Patent: Jul. 23, 2002

(54) MOTOR VEHICLE ALTERNATOR WITH INTERPOLAR MAGNETS

(75) Inventors: Paul Armiroli, Marolles-en-Brie; Jean-Philippe Badey, Etaples-sur-Mer, both of (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 09/601,148

(22) PCT Filed: Nov. 30, 1999

(86) PCT No.: PCT/FR99/02960

§ 371 (c)(1),
(2), (4) Date: Jul. 28, 2000

(87) PCT Pub. No.: WO00/33440

PCT Pub. Date: Jun. 8, 2000

(30) Foreign Application Priority Data

Nov. 30, 1998 (FR) .............................. 98 15034

(51) Int. Cl.[7] .................... H02K 21/04; H02K 1/22
(52) U.S. Cl. .................. 310/263; 310/91; 310/156.31
(58) Field of Search ................... 310/261, 263, 310/42, 156.31, 156.66, 156.69, 156.71, 156.72, 156.73; 29/596–598

(56) References Cited

U.S. PATENT DOCUMENTS

| 3,445,694 A | 5/1969 | Campbell et al. ............ 310/263 |
| 5,306,977 A | 4/1994 | Hayashi ....................... 310/263 |
| 5,903,083 A | 5/1999 | Mukai et al. ................ 310/263 |
| 6,037,695 A | 3/2000 | Kanazawa et al. ........... 310/263 |
| 6,104,118 A | * 8/2000 | Kanazawa et al. ........... 310/263 |

FOREIGN PATENT DOCUMENTS

| EP | 834979 | 4/1998 |
| EP | 844542 | 9/1998 |
| JP | 61269650 | 11/1986 |
| JP | 04165950 | 6/1992 |
| JP | 07312854 | 11/1995 |
| JP | 08317618 | 11/1996 |
| JP | 09098556 | 4/1997 |
| JP | 10174394 | 6/1998 |

OTHER PUBLICATIONS

French Search Report dated Aug. 12, 1999.
International Search Report dated Apr. 11, 2000.

* cited by examiner

*Primary Examiner*—Tran Nguyen
(74) *Attorney, Agent, or Firm*—Morgan & Finnegan, LLP

(57) ABSTRACT

The vehicle alternator comprises a rotor having interleaved pole pieces, permanent magnets disposed between the pole pieces, and at least one magnet-support strip which extends over a circumferential outside face of the pole pieces.

15 Claims, 2 Drawing Sheets

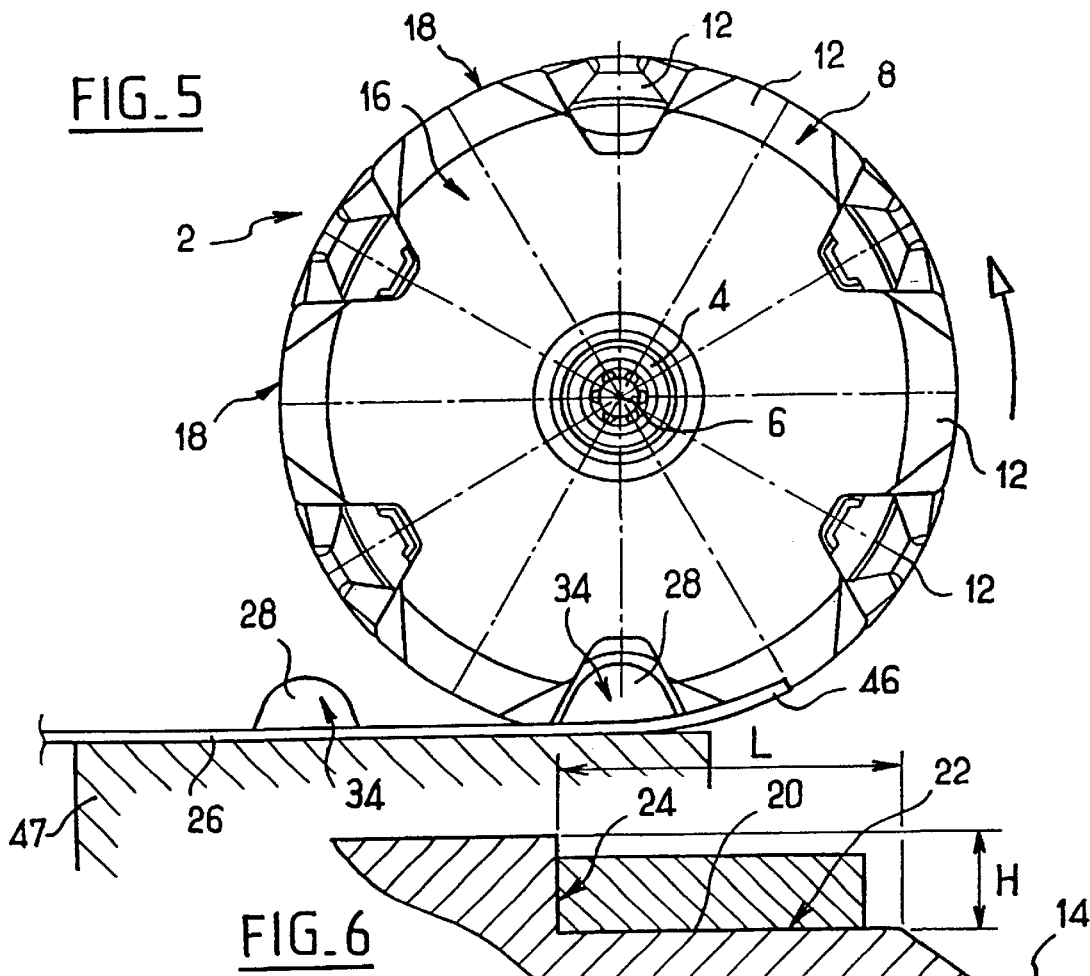
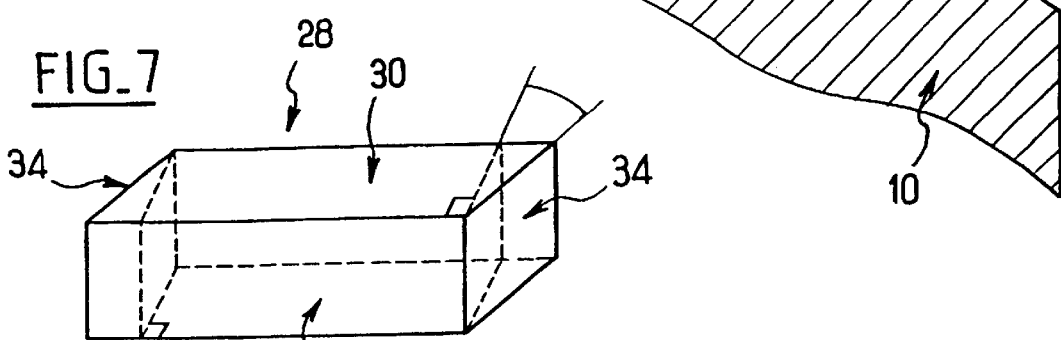
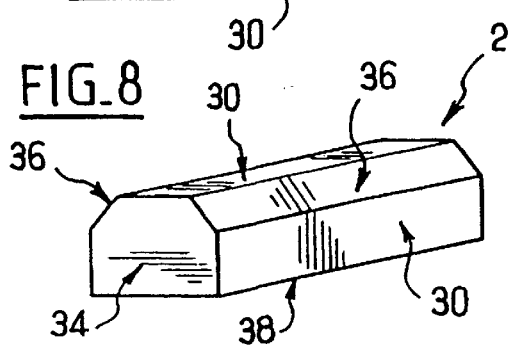
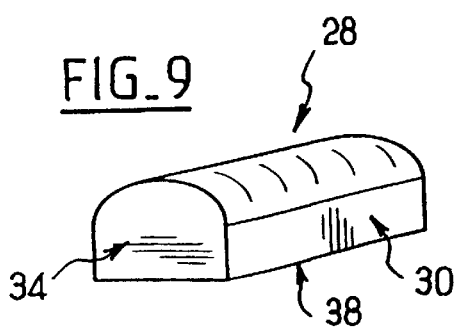

US 6,424,072 B1

MOTOR VEHICLE ALTERNATOR WITH INTERPOLAR MAGNETS

BACKGROUND OF THE INVENTION

The present invention relates in general to rotary machines of the type comprising a stator and a rotor, such as motor vehicle alternators.

An alternator rotor is known that comprises two plates carrying mutually interleaved pole pieces or claws. Permanent magnets are disposed in the gaps between adjacent pole pieces, being carried by support strips passing beneath the pole pieces. That rotor suffers from the drawback that the space occupied by the strips reduces the volume available inside the rotor beneath the pole pieces. In addition, it requires the magnets to be put into place prior to assembling the plates together, and that can be difficult or awkward depending on how the assembly line is organized.

BRIEF SUMMARY OF THE INVENTION

An object of the invention is to provide an alternator of a different type that makes it possible to increase the inside volume of the rotor.

To achieve this object, the invention provides a vehicle alternator comprising a rotor having interleaved pole pieces, permanent magnets disposed between the pole pieces, and at least one magnet-support strip, in which the or each strip extends over a circumferential outside face of the pole pieces.

Thus, the segments of the or each strip contiguous with the pole pieces (which are generally longer than the segments contiguous with the magnets) do not eat into the inside volume of the rotor. In addition, this disposition makes it possible in most cases for the or each strip and the magnets to be put into place after the pole pieces have been interleaved by assembling the plates together.

Advantageously, the or each strip extends over a circumferential outside face of the magnets.

This further increases the volume available inside the rotor. In addition, it is always possible to put the magnets into place after the pole pieces have been interleaved, e.g. by winding the strip(s) around the axis of the rotor.

Advantageously, the or each strip occupies a complete turn about the axis of the rotor.

Advantageously, the pole pieces present respective grooves for receiving the or each strip.

This prevents increasing the size of the rotor in the air gap.

Advantageously, the groove has a radial dimension relative to the axis of the rotor which is greater than the corresponding dimension of the associated strip.

In this way, the strip does not eat into the outside diameter of the rotor.

Advantageously, the groove is contiguous with a chamfer or with an axial end face of the pole pieces relative to the axis of the rotor.

Advantageously, the or each strip presents support segments contiguous with the magnets and intermediate segments extending between the magnets and of a width parallel to the axis of the rotor that is less than the corresponding width of the support segments.

This saves material in the intermediate segments without harming the quality of the support of the magnets on the support segments.

Advantageously, the magnets are stuck to the strip(s).

The invention also provides a method of manufacturing an alternator, which method includes a stage of assembling a rotor, which stage comprises the steps consisting in:

interleaving pole pieces; and fitting at least one strip carrying permanent magnets on a circumferential outside face of the pole pieces so as to place the magnets between the pole pieces.

Advantageously, the or each strip is put into place by being rolled onto the pole pieces about the axis of the rotor.

BRIEF DESCRIPTION OF THE DRAWINGS

Other characteristics and advantages of the invention appear further from the following description of a preferred embodiment given by way of non-limiting example. In the accompanying drawings:

FIG. 5 is an axial end view of the step in which the strips are wound onto the rotor;

FIG. 6 is a fragmentary axial section view showing a detail of the FIG. 1 rotor carrying the strips;

FIG. 7 is a diagrammatic view showing the general orientation of the faces of the magnets; and FIGS. 8 and 9 show two embodiments of the magnets.

DETAILED DESCRIPTION OF THE INVENTION

Figure 1:
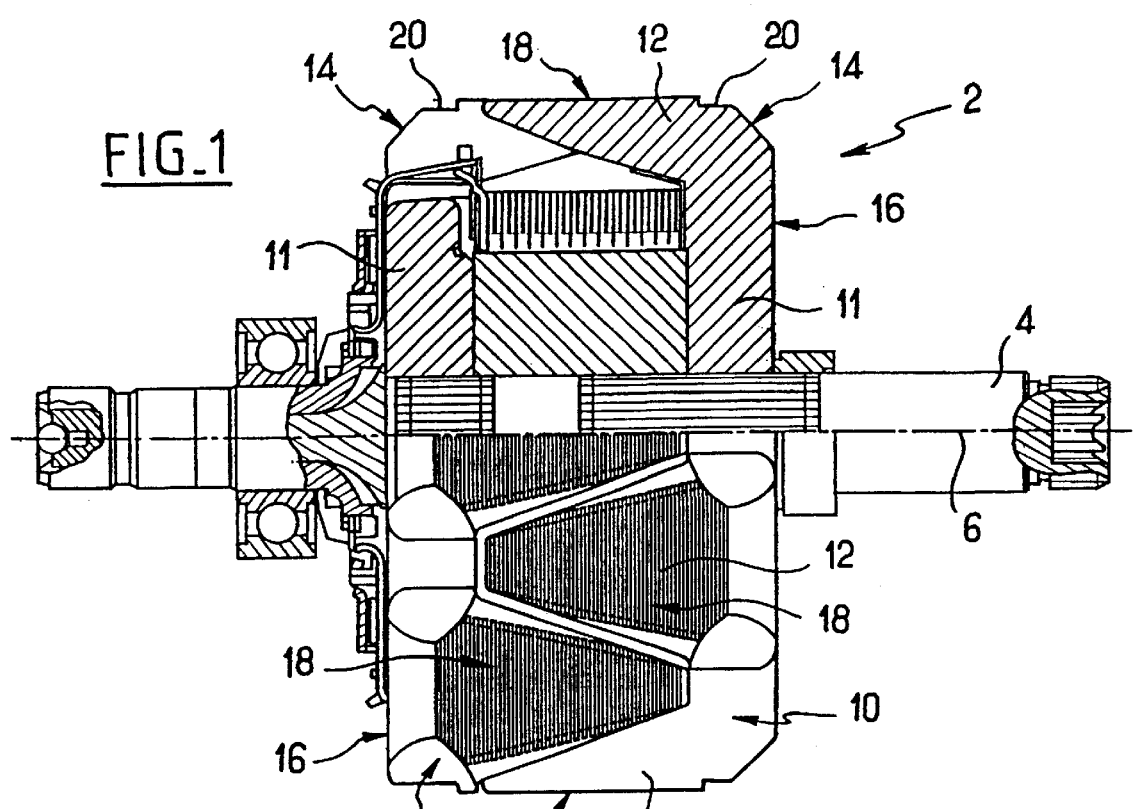
FIG. 1 is in part a side view and in part an axial section view of the rotor of an alternator of the invention without the strips.

With reference to FIGS. 1 and 5, in the present embodiment of the invention, the rotor 2 of a motor vehicle alternator comprises a shaft 4 of axis 6 and two pole plates 8 and 10 each having a plane central wall 11 in the form of a disk on the axis 6. The plate 8 on the left in FIG. 1 is designed to be adjacent to a collector of the alternator, unlike the other plate 10 on the right.

In conventional manner, each plate 8 and 10 has pole pieces 12, each generally in the form of a plane triangle extending parallel to the axis 6. On each plate, the pole pieces 12 extend from the central wall 11 with the tip of each pole piece extending towards the other plate, and all of them extending in the same direction. On each plate, the pole pieces are spaced apart from one another so as to define gaps between them for receiving respective pole pieces of the other plate, such that the pole pieces of the two plates are mutually interleaved. Each plate 8, 10 has a chamfer 14, in this case at 45° relative to the axis 6, at the junction between an axial end face 16 of the pole pieces 12 extending perpendicularly to the axis 6, and a circumferential outside face 18 of the pole pieces extending parallel to the axis 6.

On the circumferential outside face 18 of the pole pieces, there is provided an L-profile groove 20 contiguous with the chamfer 14, having a horizontal flank 22 parallel to the outside face 18 and to the axis 6, and a rectilinear flank 24 perpendicular thereto. The rectilinear flank 24 has a height H which corresponds to the depth of the groove in a direction extending radially to the axis. The horizontal flank 22 is of width L, corresponding to the width of the groove parallel to the axis.

Figures 2, 3, 4:
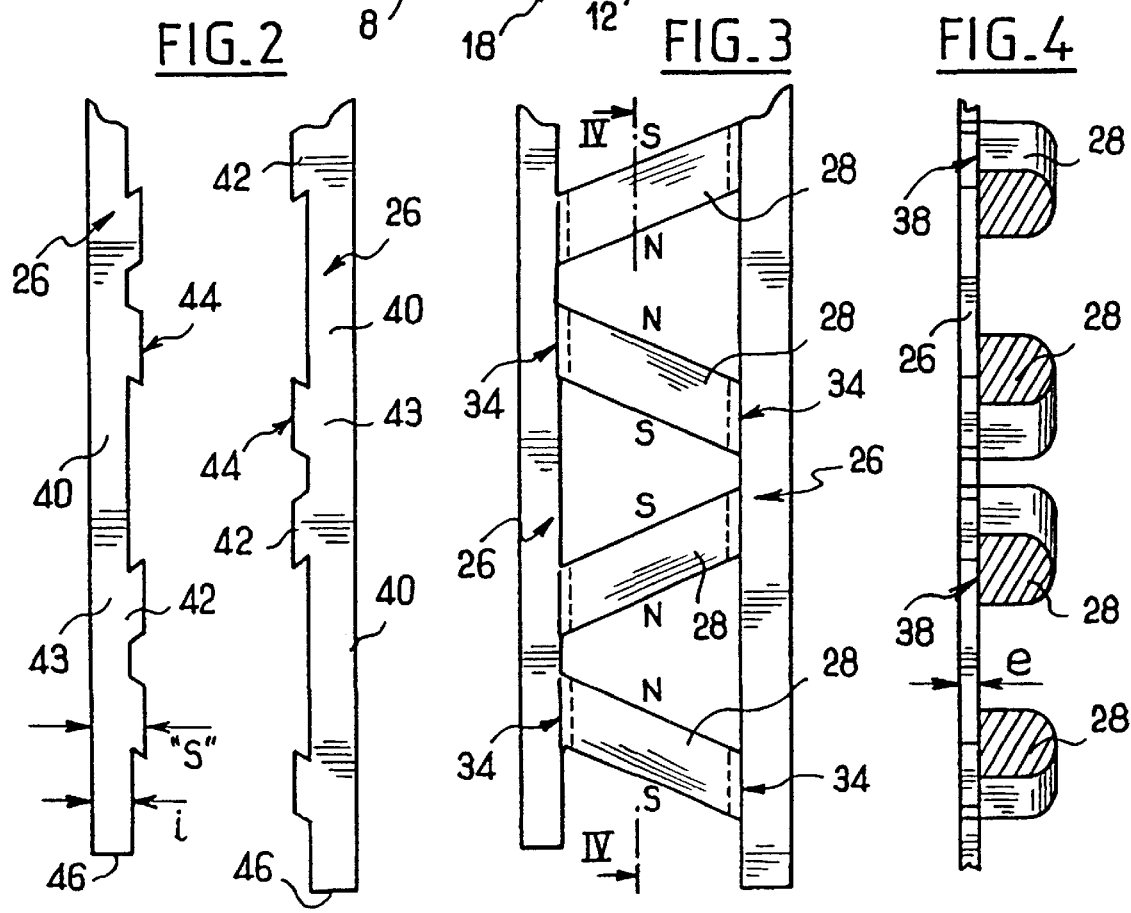
FIG. 2 is an elevation view of strips for the FIG. 1 rotor.
FIG. 3 is a view analogous to FIG. 2 showing the magnets on the strips.
FIG. 4 is a view of the strips and the magnets in section on plane IV—IV of FIG. 3.

With reference to FIGS. 2 to 4, the rotor has at least one elongate flap strip 26, and in this case it has two such strips, and with reference to FIGS. 3, 4, 7, 8, and 9, it also has permanent magnets 28. The magnets are identical to one another. They are generally in the form of a rectangular parallelepiped that is elongate in one of its dimensions. The four elongate faces 30 of the parallelepiped that extend parallel to said dimension form a rectangular section, however the end faces 24 of the parallelepiped, which are parallel to each other, are inclined relative to said dimensions. The shape is thus that of a rectangular parallelepiped except that the end faces slope relative to the longitudinal axis. With reference to FIGS. 7, 8, and 9, each magnet 28 can have two longitudinal chamfers 36 so as to form a top of reduced width, opposite to a bottom 38 of the magnet, or so as to have a cross-section that is rounded in the vicinity of the top.

The two strips 26 extend parallel to each other with their main faces coplanar. The magnets 28 are disposed with their bottoms 38 on the strips so that the end faces 34 of the magnets are parallel to the longitudinal direction of the strips 26. Consequently, the longitudinal axis of each magnet 28 is inclined relative to the longitudinal direction of the strips. In addition, the magnets 28 are made so that the angle of inclination of their end faces 34 is constant in absolute terms, but alternates between being associated with one side and the other. There are thus two groups of magnets 28 referred to herein as "left" magnets and "right" magnets, which are organized alternately along the strips 26 so that the angles of inclination of the axes of the magnets alternate. As a result, the magnets 28 form a zigzag configuration. The permanent magnets 28 are polarized so that identical poles, North or South, associated with the longitudinal side faces of the magnets, face each other between consecutive pairs of magnets.

The magnets are disposed on the same face of the strips, with the bottoms 38 of the magnets being adjacent to the strips 26, while the tops thereof stand at a distance from the strips. The strips 26 have intermediate segments 40 that extend across the gaps between the magnets 28 when seen in plan view. All of these segments 40 are of the same width i. Between segments, the strips have projections 42 that support the magnets 28 and that extend from the support segments 43 of the strip which are located between the intermediate segments 40. The extensions 42 have respective end edges 44 extending parallel to one of the edges of the intermediate segments 40, and side edges that slope at the same angle as the magnets 28. The projections 42 project from that side of each strip which faces the other strip, such that the width s of each support segment 43 is greater than the width i of the intermediate segments 40. The magnets 28 are disposed with their axial end portions lying on the extensions 42, thereby forming bridges between the strips 26. They are fixed thereto by adhesive. The strips 26 are of thickness e that is smaller than the height H of the grooves 20. The width i of the intermediate segments 40 is less than the width L of the grooves 20. The strips 26 are identical to each other and they are disposed facing each other with a certain longitudinal offset, as can be seen in FIG. 2, prior to receiving the magnets.

To manufacture the rotor, the various parts visible in FIG. 1 are assembled together, and in particular the shaft 6 and the plates 8 and 10 with the pole pieces 12 being interleaved.

To enable the rotor to receive the strips 26 and the magnets 28 which are assembled thereto as shown in FIGS. 3 and 4, a free end 46 of each strip 26 is fixed to the rotor, with said ends occupying respective grooves 20, and with the strips 26 being extended, e.g. on a plane support 47, so as to be rectilinear and coplanar with the grooves, i.e. perpendicular to a plane that is radial relative to the axis 6. The strips 28 project from that side of the strip 26 that faces the rotor. It then suffices to roll the strips 26 circumferentially onto the rotor so that the strips occupy the grooves 20, e.g. by rolling the rotor along the support 47 over the strips. The magnets are placed on the strips in such a manner that they are then inserted, beginning with their tops, into the gaps between adjacent pole pieces 12. The strips 26 are of a length such that each strip makes one complete turn around the axis 6 of the rotor. Rolling is terminated by placing the ends of the strips in exactly end-to-end and coplanar relationship. The ends are then bonded together.

The strips can be fixed to the rotor by adhesive, by brazing, or by spot-welding.

A rotor is thus obtained in which the strips 26 extend over a circumferential outside face 18 of the pole pieces 12 and over the bottoms 38 of the magnets which have become the circumferentially outer faces thereof.

The strips are made of a non-magnetic material by being cut out from a sheet. By way of example, the height L of the grooves 20 can lie in the range 0.3 mm to 2 mm, and the width L thereof can lie in the range 2 mm to 5 mm.

What is claimed is:

1. A vehicle alternator comprising a rotor having interleaved pole pieces, permanent magnets disposed between the pole pieces, and at least one magnet-support strip carrying at least one permanent magnet, wherein each magnet-support strip of said at least one magnet-support strip extends over a circumferential outside face of the pole pieces.

2. An alternator according to claim 1, wherein said each magnet-support strip extends over a circumferential outside face of the magnets.

3. An alternator according to claim 1, wherein said each magnet-support strip occupies a complete turn about the axis or the rotor.

4. An alternator according to claim 3, wherein the pole pieces present respective grooves for receiving each magnet-support strip.

5. An alternator according to claim 1, wherein the pole pieces present respective grooves for receiving each magnet-support strip.

6. An alternator according to claim 5, wherein the groove has a radial dimension relative to the axis of the rotor which is greater than the corresponding dimension of the magnet-support strip received therein.

7. An alternator according to clime 6, wherein the groove is contiguous with a chamfer or with an axial end face of the pole pieces relative to the axis of the rotor.

8. An alternator according to claim 5, wherein the groove is contiguous with a chamfer or with an axial end face of the pole pieces relative to the axis of the rotor.

9. An alternator according to claim 8, wherein each magnet-support strip presents support segments extending between the magnets and of a width parallel to the axis of the rotor that is less than the corresponding width of the support segments.

10. An alternator according to claim 1, wherein said each magnet-support strip presents support segments contiguous with magnets and intermediate segments extending between the magnets and of a width parallel to the axis of the rotor that is less than the corresponding width of the support segments.

11. An alternator according to claim 1, wherein the magnets are stuck to the respective said at least one magnet-support strip.

12. A method of manufacturing an alternator including a stage of assembling a rotor, the method comprising the steps of:

interleaving pole pieces; and fitting at least one strip carrying at least one permanent magnet on a circumferential outside face of the pole pieces so as to place the magnets between the pole pieces.

13. An alternator according to claim 12, wherein each strip is put into place by being rolled onto the pole pieces about the axis of the rotor.

14. A vehicle alternator comprising a rotor having interleaved pole pieces, permanent magnets disposed between the pole pieces, and at least one magnet-support strip carrying at least one permanent magnet, wherein each magnet-support strip of said at least one magnet-support strip extends over a circumferential outside face of the pole pieces, and said each magnet-support strip presents support segments contiguous with magnets and intermediate segments extending between the magnets and of a width parallel to the axis of the rotor that is less than the corresponding width of the support segments.

15. A vehicle alternator comprising a rotor having interleaved pole pieces, permanent magnets disposed between the pole pieces, and at least one magnet-support strip carrying at least one permanent magnet, wherein each magnet-support strip of said at least one magnet-support strip extends over a circumferential outside face of the pole pieces, wherein the pole pieces present respective grooves for receiving each magnet-support strip, wherein said groove is contiguous with a chamfer or with an axial end face of the pole pieces relative to the axis of the rotor, wherein said magnet-support strip presents support segments extending between the magnets and of a width parallel to the axis of the rotor that is less than the corresponding width of the support segments.

* * * * *

UNITED STATES PATENT AND TRADEMARK OFFICE
CERTIFICATE OF CORRECTION

PATENT NO. : 6,424,072 B1 Page 1 of 1
APPLICATION NO. : 09/601148
DATED : July 23, 2002
INVENTOR(S) : Paul Armiroli and Jean-Philippe Badey It is certified that error appears in the above-identified patent and that said Letters Patent is hereby corrected as shown below:

ON THE TITLE PAGE

Item (73) Assignee
should read --VALEO EQUIPEMENTS ELECTRIQUES MOTEUR --

IN THE CLAIMS

Column 4, claim 7, line 45, please delete "clime" and insert therefor -- claim --

Signed and Sealed this

Seventeenth Day of July, 2007

JON W. DUDAS
*Director of the United States Patent and Trademark Office*